United States Patent
Zhang et al.

(10) Patent No.: US 8,706,896 B2
(45) Date of Patent: Apr. 22, 2014

(54) GUARANTEED BANDWIDTH MEMORY APPARATUS AND METHOD

(75) Inventors: Song Zhang, San Jose, CA (US); Phil Lacroute, Sunnyvale, CA (US); Anurag P. Gupta, Saratoga, CA (US); Raymond M. Lim, Los Altos Hills, CA (US); Avanindra Godbole, San Jose, CA (US); Debashis Basu, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 13/587,557

(22) Filed: Aug. 16, 2012

(65) Prior Publication Data

US 2012/0311175 A1    Dec. 6, 2012

Related U.S. Application Data

(63) Continuation of application No. 09/942,625, filed on Aug. 31, 2001, now Pat. No. 8,271,672.

(51) Int. Cl.
    *G06F 15/16*    (2006.01)

(52) U.S. Cl.
    USPC .......................................... 709/231; 709/233

(58) Field of Classification Search
    USPC ................................................ 709/231, 233
    See application file for complete search history.

(56) References Cited

U.S. PATENT DOCUMENTS

| | | | |
|---|---|---|---|
| 5,153,877 A * | 10/1992 | Esaki et al. | 370/389 |
| 5,237,570 A * | 8/1993 | Smolinske et al. | 370/348 |
| 5,602,852 A | 2/1997 | Shiobara | |
| 5,721,955 A | 2/1998 | Cedros et al. | |
| 5,754,961 A | 5/1998 | Serizawa et al. | |
| 5,761,417 A | 6/1998 | Henley et al. | |
| 5,815,170 A | 9/1998 | Kimura et al. | |
| 5,828,902 A | 10/1998 | Tanaka et al. | |
| 5,875,192 A | 2/1999 | Cam et al. | |
| 5,875,309 A | 2/1999 | Itkowsky et al. | |
| 5,923,755 A | 7/1999 | Birch | |
| 5,926,459 A | 7/1999 | Lyles et al. | |
| 5,930,014 A | 7/1999 | Yamamoto | |
| 5,970,067 A | 10/1999 | Sathe et al. | |
| 6,061,348 A | 5/2000 | Castrigno et al. | |
| 6,078,958 A | 6/2000 | Echeita et al. | |
| 6,085,238 A | 7/2000 | Yuasa et al. | |
| 6,167,445 A | 12/2000 | Gai et al. | |
| 6,173,369 B1 | 1/2001 | Nguyen et al. | |
| 6,199,131 B1 | 3/2001 | Melo et al. | |
| 6,240,508 B1 | 5/2001 | Brown et al. | |
| 6,269,096 B1 | 7/2001 | Hann et al. | |
| 6,321,233 B1 | 11/2001 | Larson | |

(Continued)

OTHER PUBLICATIONS

Non-final Office Action from U.S. Appl. No. 09/991,109 mailed Nov. 26, 2008, 10 pages.

(Continued)

*Primary Examiner* — Kristie Shingles

(74) *Attorney, Agent, or Firm* — Harrity & Harrity, LLP

(57) ABSTRACT

Output logic generates read requests using a programmable schedule that controls read bandwidth for multiple data streams and stores the read requests in a queuing device. The output logic also dequeues the read requests based on a similar programmable schedule, forwards the read requests to the memory, and reads data units from the memory based on the read requests.

20 Claims, 13 Drawing Sheets

(56) References Cited

U.S. PATENT DOCUMENTS

| | | |
|---|---|---|
| 6,490,296 B2 | 12/2002 | Shenoi et al. |
| 6,577,596 B1 | 6/2003 | Olsson et al. |
| 6,598,034 B1 | 7/2003 | Kloth |
| 6,658,014 B1 | 12/2003 | Tezuka et al. |
| 6,674,805 B1 | 1/2004 | Kovacevic et al. |
| 6,678,275 B1 | 1/2004 | DeGrandpre et al. |
| 6,693,909 B1 | 2/2004 | Mo et al. |
| 6,721,789 B1 | 4/2004 | DeMoney |
| 6,742,118 B1 | 5/2004 | Doi et al. |
| 6,754,741 B2 | 6/2004 | Alexander et al. |
| 6,771,600 B2 | 8/2004 | Kawarai et al. |
| 6,782,007 B1 | 8/2004 | Redman |
| 6,788,702 B1 | 9/2004 | Garcia-Luna-Aceves et al. |
| 6,795,506 B1 | 9/2004 | Zhang et al. |
| 6,816,907 B1 | 11/2004 | Mei et al. |
| 6,822,960 B1 | 11/2004 | Manchester et al. |
| 6,941,252 B2 | 9/2005 | Nelson et al. |
| 6,947,450 B2 | 9/2005 | Mangin |
| 6,970,921 B1 | 11/2005 | Wang et al. |
| 6,978,311 B1 | 12/2005 | Netzer et al. |
| 7,016,366 B2 | 3/2006 | Kawarai et al. |
| 7,050,468 B2 | 5/2006 | Seto et al. |
| 7,082,102 B1 | 7/2006 | Wright |
| 7,151,749 B2 | 12/2006 | Vega-Garcia et al. |
| 7,151,774 B1 | 12/2006 | Williams et al. |
| 7,158,515 B1 * | 1/2007 | Wang et al. ................ 370/392 |
| 7,184,434 B2 | 2/2007 | Ganti et al. |
| 7,447,982 B1 * | 11/2008 | Thurston ................ 714/785 |
| 7,698,454 B1 | 4/2010 | Dyckerhoff et al. |
| 8,271,672 B1 * | 9/2012 | Zhang et al. ................ 709/231 |
| 2001/0023445 A1 | 9/2001 | Sundqvist |
| 2002/0046251 A1 | 4/2002 | Siegel |
| 2002/0071389 A1 | 6/2002 | Seo |

OTHER PUBLICATIONS

Non-final Office Action from U.S. Appl. No. 09/991,109 mailed May 20, 2008, 10 pages.

Non-final Office Action from U.S. Appl. No. 09/991,109 mailed Oct. 3, 2007, 12 pages.

Final Office Action from U.S. Appl. No. 09/991,109 mailed Jun. 12, 2007, 12 pages.

Non-final Office Action from U.S. Appl. No. 09/991,109 mailed Dec. 13, 2006, 10 pages.

Non-final Office Action from U.S. Appl. No. 09/991,109 mailed Jul. 3, 2006, 8 pages.

Non-final Office Action from U.S. Appl. No. 09/991,109 mailed Jan. 19, 2006, 12 pages.

Final Office Action from U.S. Appl. No. 09/991,109 mailed Jul. 27, 2005, 11 pages.

Non-final Office Action from U.S. Appl. No. 09/991,109 mailed Feb. 18, 2005, 19 pages.

Co-pending U.S. Appl. No. 09/942,625, filed Aug. 31, 2001, Song Zhang et al., entitled "Guaranteed Bandwidth Memory Apparatus and Method".

* cited by examiner

| 000011 | 010101 | ... | | | | | |
|---|---|---|---|---|---|---|---|
| 0 | 1 | 2 | | | | 126 | 127 |

GUARANTEED BANDWIDTH MEMORY APPARATUS AND METHOD

RELATED APPLICATION

This application is a continuation of U.S. patent application Ser. No. 09/942,625, filed Aug. 31, 2001, the disclosure of which is incorporated herein by reference.

BACKGROUND OF THE INVENTION

1. Field of the Invention

The present invention relates generally to data transfer and, more particularly, to reading data stored in a memory.

2. Description of Related Art

Conventional network devices, such as routers, transfer packets through a network from a source to a destination. Typically, the network device receives packets from a number of different data streams and one or more memory subsystems on the network device store the packets while the packets are processed. As the network device begins reading the data from the memory for output to its intended destination, the network device typically buffers the data cells associated with a single packet before transmitting the entire packet.

As the number of data streams supported by the network device and the required line rates of these streams increase, buffering entire packets before transmitting the packets causes problems. For example, if buffer space for storing the cells of a packet runs out, packet corruption may occur.

In addition, in typical situations, the processing associated with the received data streams may be uneven. That is, the output processing for some streams may require data from the memory subsystem more often than other streams. Conventional network devices are unable to service a large number of data streams that access a memory system unevenly while maintaining the required line rates, which may result in packet underrun errors.

Therefore, there exists a need for systems and methods that provide memory read bandwidth for a large number of data streams and maintain the required line rates for these data streams.

SUMMARY OF THE INVENTION

Systems and methods consistent with the present invention address these and other needs by using a programmable time division multiplexing (TDM) arbitration scheme that controls access to a memory. Each data stream supported by the network device is guaranteed a read bandwidth based on the programmable TDM arbitration scheme, regardless of the activity of the other data streams.

In accordance with the purpose of the invention as embodied and broadly described herein, a system that reads data in a network device includes a memory and output logic. The memory is configured to store data units from a plurality of data streams. The output logic is configured to generate read requests using a first programmable schedule, the programmable schedule controlling read bandwidth for the data streams. The output logic is also configured to store the read requests and process the read requests based on a second programmable schedule. The output logic is further configured to read data units from the memory based on the read requests.

In another implementation consistent with the present invention, a method for processing packets in a network device is provided. The method includes storing, in a memory, data units from a plurality of input streams, a number of the data units comprising a data packet from each of the respective input streams. The method also includes generating read requests for reading the data units from the memory using a first time division multiplexing scheme, storing the read requests and processing the read requests using a second time division multiplexing scheme. The method further includes forwarding the processed read requests to the memory and reading data units from the memory based on the read requests.

In a further implementation consistent with the present invention, a system for reading data in a network device is provided. The system includes a memory, first and second arbiters, a request engine and a request store. The memory is configured to store data units from a plurality of data streams, a number of the data units comprising data packets from one of the data streams. The first arbiter is configured to identify which data stream to service using a first time division multiplexing scheme, the first arbiter outputting stream number information that indicates the identified data stream. The request engine is configured to receive the stream number information and output read requests, the read requests identifying addresses in the memory. The request store is configured to store a plurality of read requests for each of the plurality of data streams. The second arbiter is configured to process the read requests using a second time division multiplexing scheme and forward the read requests to the memory. The memory outputs data units based on the read requests.

In still another implementation consistent with the present invention, a system for processing information is provided. The system includes a memory that stores address information relating to locations of data cells associated with a plurality of data streams. The system also includes a programmable table having a number of entries, where each of the entries store a value that identifies one of the plurality of data streams. The system further includes control logic that is configured to identify one of the data streams to service based on the entries of the programmable table and output the address information associated with the identified data stream from the memory.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 11 is an exemplary diagram of the state tracker of FIG. 9 according to an implementation consistent with principles of the invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods, consistent with principles of the invention, provide a two-level arbitration scheme that provides efficient use of the memory of a network device. Each data stream is guaranteed a certain read bandwidth based on a programmable TDM arbitration scheme. The two-level arbitration scheme controls the storing of read requests and dequeuing of the read requests. In addition, data cells read from memory for a single packet may be transmitted without buffering all of the cells for that packet, thereby permitting the network device to support faster communication line rates.

Exemplary Network Device Configuration

Figure 1:
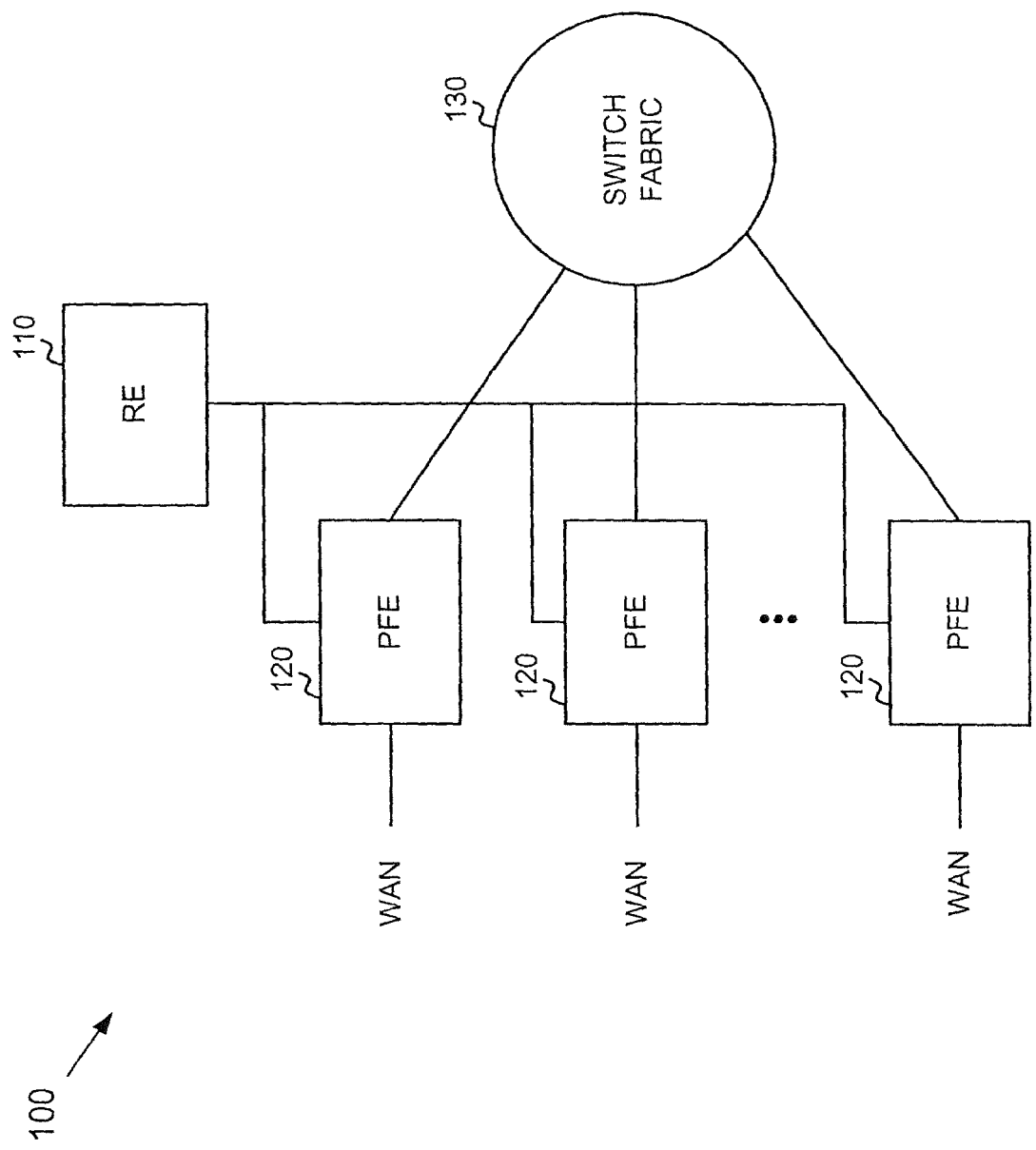
FIG. 1 is a diagram of an exemplary network device in which systems and methods consistent with principles of the invention may be implemented.

FIG. 1 is a diagram of an exemplary network device in which systems and methods consistent with the principles of the invention may be implemented. In this particular implementation, the network device takes the form of a router 100. Router 100 may receive one or more data streams from a physical link, process the data stream(s) to determine destination information, and transmit the data stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more PFEs 120. In an implementation consistent with the present invention, each of the switching planes includes a three-stage switch of crossbar elements.

RE 110 may include processing logic that performs high level management functions for router 100. For example, RE 110 may communicate with other networks and systems connected to router 100 to exchange information regarding network topology. RE 110 may create routing tables based on the network topology information. Based on the routing tables, RE 110 creates forwarding tables and forwards the forwarding tables to PFEs 120. PFEs 120 may use the forwarding tables to perform route lookup for incoming packets. RE 110 may also perform other general control and monitoring functions for router 100.

Each of PFEs 120 connects to RE 110 and switch fabric 130. PFEs 120 receive data on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

Figure 2:
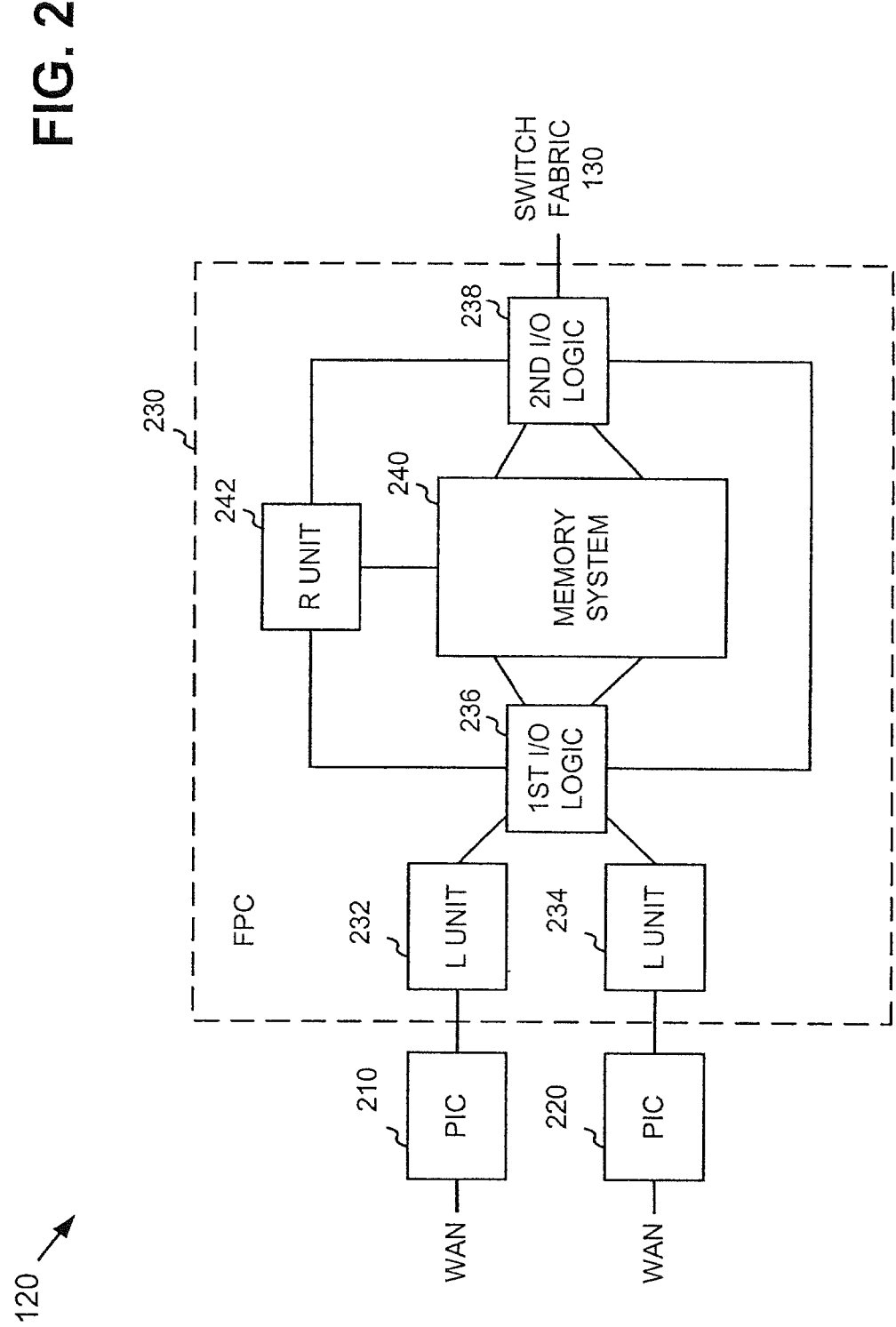
FIG. 2 is an exemplary diagram of a packet forwarding engine (PFE) of FIG. 1 according to an implementation consistent with principles of the invention.

FIG. 2 is an exemplary diagram of a PFE 120 according to an implementation consistent with the principles of the invention. PFE 120 may include physical interface cards (PICs) 210 and 220 connected to a flexible port concentrator (FPC) 230. While two PICs 210 and 220 are shown in FIG. 2, there may be more or less PICs in other implementations.

PICs 210 and 220 connect to WAN physical links and FPC 230 and transport data between the WAN physical links and FPC 230. Each of PICs 210 and 220 transmit data between a WAN physical link and FPC 230. Each of PICs 210 and 220 may be designed to handle a particular type of physical link. For example, a particular PIC may be provided to handle only Ethernet communications.

For incoming data, PICs 210 and 220 may strip off the layer 1 (L1) protocol information and forward the remaining data, raw packets, to FPC 230. For outgoing data, PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include L units 232 and 234, first input/output (I/O) logic 236, second input/output (I/O) logic 238, memory system 240, and R unit 242. Each of the L units 232 and 234 corresponds to one of the PICs 210 and 220. L units 232 and 234 may process packet data flowing between PICs 210 and 220, respectively, and first I/O logic 236. Each of the L units 232 and 234 may operate in two modes: a first mode for processing packet data received from PIC 210 or 220 and a second mode for processing packet data received from first I/O logic 236.

In the first mode, the L unit 232 or 234 may process packets from PIC 210 or 220, respectively, convert the packets into data (D) cells, and transmit the D cells to first I/O logic 236. D cells are the data structure used internally by FPC 230 for transporting and storing data. In one implementation, D cells are 64 bytes in length.

Packets received by the L unit 232 or 234 may include two portions: a header portion and a packet data portion. For each packet, the L unit 232 or 234 may process the header and insert the results of the processing into the first two D cells carrying the packet. For example, the L unit 232 or 234 may parse L2 and L3 headers of incoming packets. The L unit 232 or 234 may also create control information based on the packet. The control information may be based on the packet header, the packet data, or both. The L unit 232 or 234 may then store the processed header information, control information, and the packet data in D cells, which it sends to first I/O logic 236.

In the second mode, the L unit 232 or 234 handles data flow in the opposite direction to the first mode. In the second mode, the L unit 232 or 234 receives D cells from first I/O logic 236, extracts the header information, control information, and packet data from the D cells, and creates a packet based on the extracted information. The L unit 232 or 234 creates the packet header from the header information and possibly the control information from the D cells. In one implementation, the L unit 232 or 234 creates L2 and L3 header information based on the header and control information. The L unit 232 or 234 may load the packet data portion with the packet data from the D cells.

First I/O logic 236 and second I/O logic 238 coordinate data transfers into and out of FPC 230. First I/O logic 236 receives D cells from L units 232 and 234, and second I/O logic 238 receives D cells from switch fabric 130. Upon receiving D cells for a packet, the I/O logic may extract certain fields from the D cells and create a notification based on the extracted fields.

First I/O logic 236 and second I/O logic 238 store the D cells in memory system 240. The location of each D cell is stored in the notification. In one implementation, instead of storing addresses in the notification, only the address of the first D cell is stored in the notification, and the remaining D cell locations are identified in the notification by offsets from the first address. If the notification cannot store all the D cell addresses, the overflow D cell addresses are stored in memory system 240 in indirect address cells (I cells).

After storing the D cells and I cells for a packet in memory system 240, first I/O logic 236 and second I/O logic 238 send the notification to R unit 242. While first I/O logic 236 and second I/O logic 238 are shown as separate units, they may be implemented as a single unit in other implementations consistent with principles of the invention.

R unit 242 may include processing logic that provides route lookup, accounting, and policing functionality. R unit 242 may receive one or more forwarding tables from RE 110 (FIG. 1) and uses the forwarding table(s) and a route lookup key extracted from the notification to perform route lookups. R unit 242 may insert the lookup result into the notification received from first I/O logic 236 or second I/O logic 238, which it may store in memory system 240.

Figure 3:
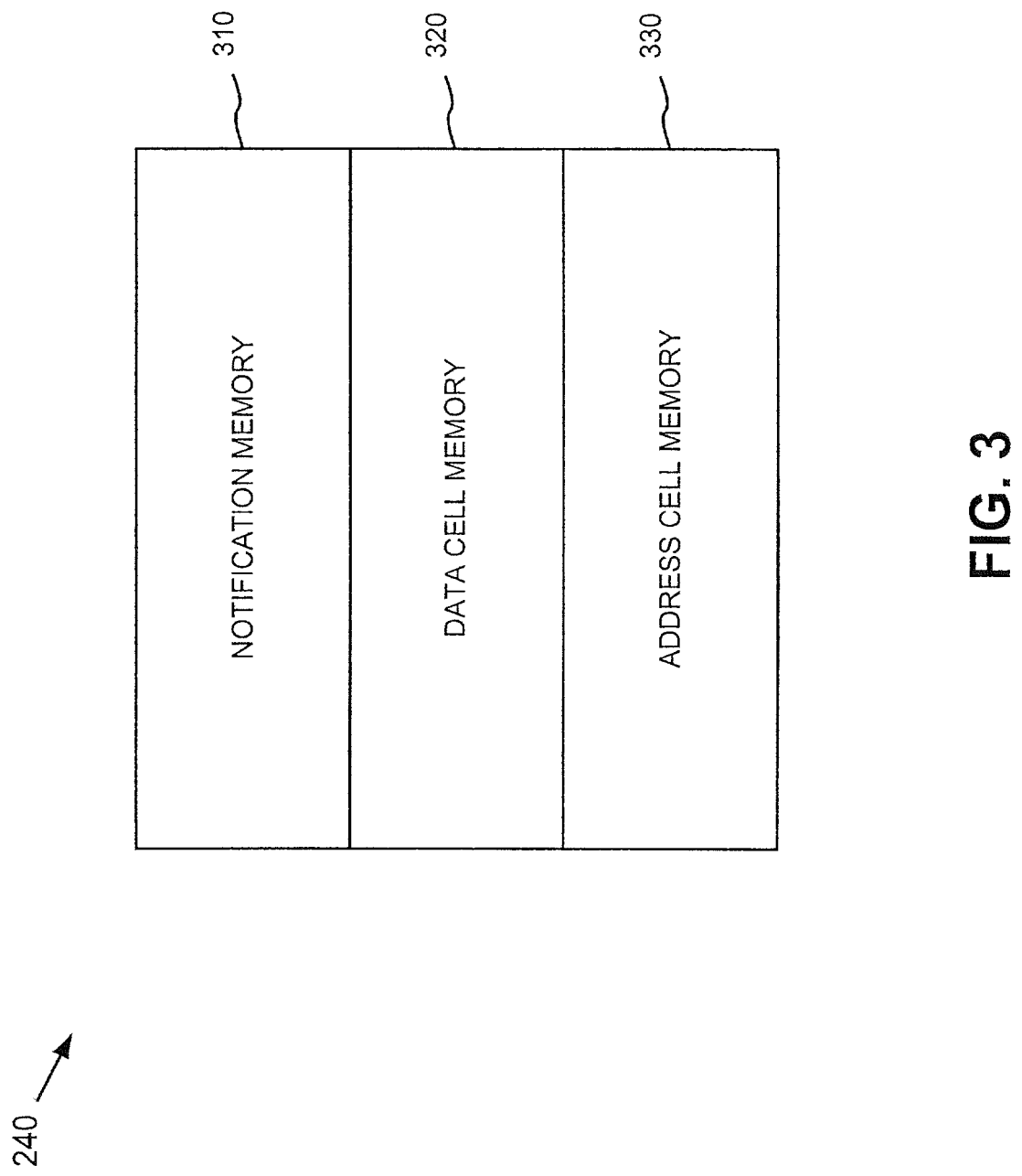
FIG. 3 is an exemplary diagram of an element of the memory system of FIG. 2 according to an implementation consistent with principles of the invention.

Memory system 240 may temporarily store D cells and I cells from first I/O logic 236 and second I/O logic 238 and notifications from R unit 242. FIG. 3 is an exemplary diagram of an element of memory system 240 according to an implementation consistent with the principles of the invention. Memory system 240 may be implemented as one or more memory devices and may include a notification memory 310, a data cell memory 320, and an address cell memory 330. Although the memory areas are illustrated as three contiguous areas adjacent to one another, in another embodiment, each area may be distributed in memory, having different portions of each area stored in non-contiguous memory areas.

Figure 4:
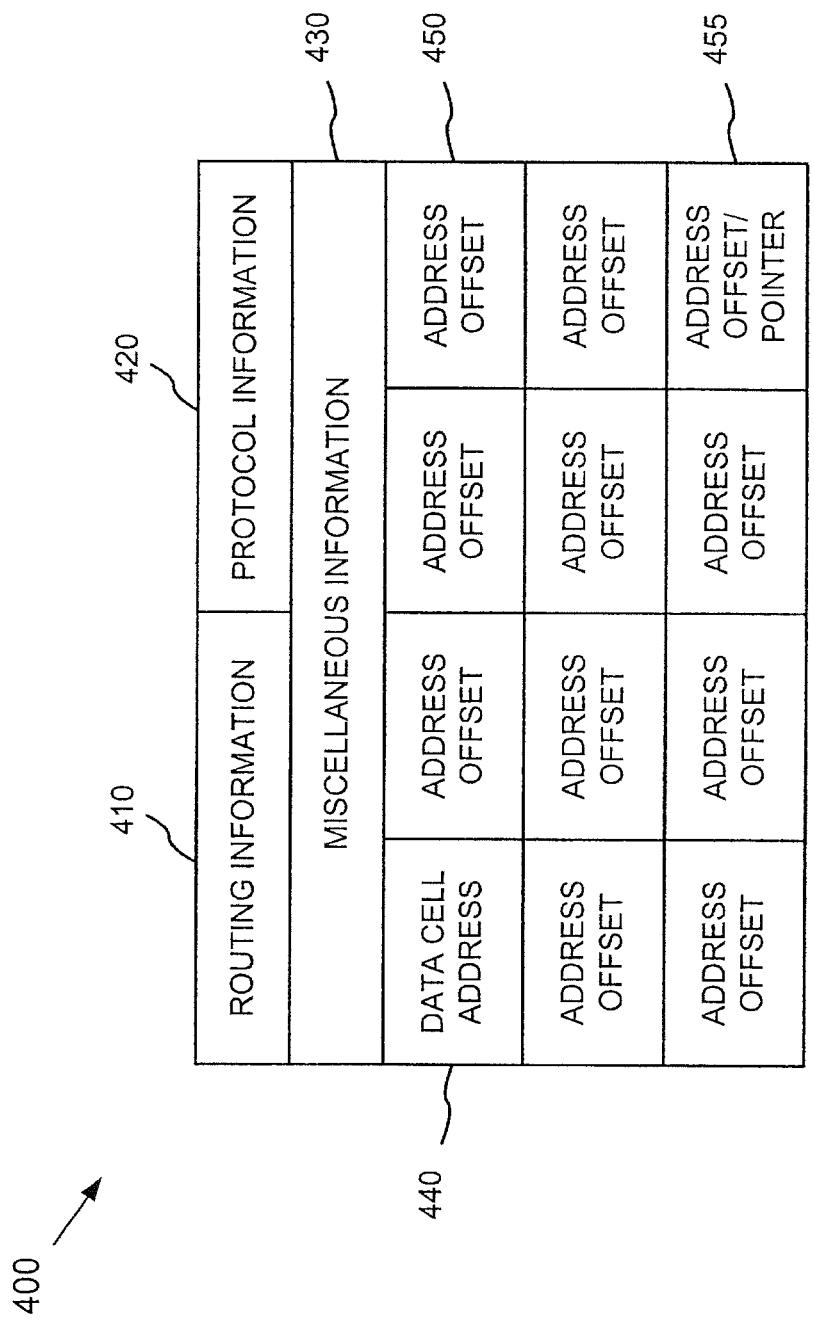
FIG. 4 is an exemplary diagram of a notification according to an implementation consistent with principles of the invention.

Notification memory 310 may store notifications from R unit 242. FIG. 4 is an exemplary diagram of a notification 400 according to an implementation consistent with the present invention. Notification 400 may include several fields, such as a routing information field 410, a protocol information field 420, miscellaneous information field 430, a data cell address field 440, and address offset fields 450. Routing information field 410 may store information regarding a source, destination, input and output PICs, etc. of a packet. Protocol information field 420 may store information regarding the protocol associated with the packet. Miscellaneous information field 430 may store other packet-related information, such as quality of service (QoS), validity, priority, and length data. Although the fields are illustrated as contiguous fields and adjacent to one another, in another embodiment portions of each field may be mixed together.

Data cell address field 440 may store an actual address of a data cell stored in data cell memory 320. Address offset fields 450 store data that identify the addresses of the remaining data cells for the packet in data cell memory 320 based on their relationship to the actual address, or as offsets from the actual address. In another implementation consistent with the principles of the invention, address offset fields 450 store actual addresses of data cells in data cell memory 320.

One of address offset fields 450 (identified as address offset/pointer field 455) may store an address offset, similar to address offset fields 450, or a pointer to an I cell in address cell memory 330. Whether address offset/pointer field 455 stores an address offset or a pointer may be based on the size of the corresponding packet. For example, for large packets (i.e., packets requiring more data cells than the number of address offsets 450 in notification 400), address offset/pointer field 455 may store a pointer to an I cell in address cell memory 330. For small packets (i.e., packets having fewer data cells than the number of available address offsets 450 in notification 400), on the other hand, address offset/pointer field 455 may store an address offset, if necessary, as described above.

Returning to FIG. 3, data cell memory 320 may store data cells of a packet. In an implementation consistent with the principles of the invention, the data cells of a packet are stored at non-contiguous locations within data cell memory 320.

Address cell memory 330 may store I cells that contain addresses (or address offsets) of data cells stored in data cell memory 320. A packet may have associated I cells when the number of data cells of the packet exceeds the number of address offsets 450 (FIG. 4) in notification 400.

Figure 5:
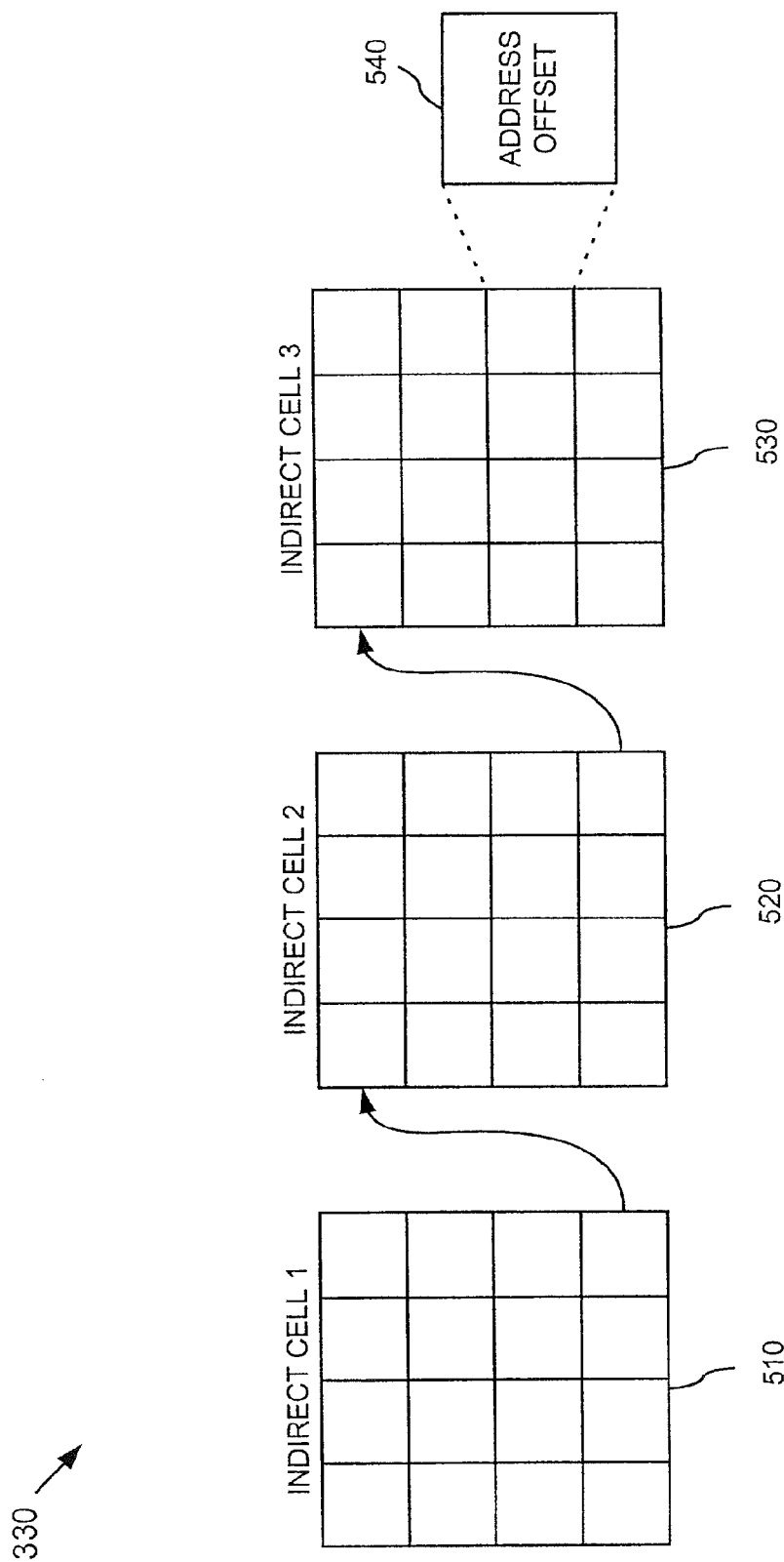
FIG. 5 is exemplary diagram of the address cell memory of FIG. 3 according to an implementation consistent with principles of the invention.

The I cells may be stored as a linked list within address cell memory 330. FIG. 5 is exemplary diagram of address cell memory 330 according to an implementation consistent with the principles of the invention. Address cell memory 330 may include multiple I cells, such as I cells 510-530. While three I cells 510-530 are shown in FIG. 5, there may be more or less I cells in other implementations consistent with the principles of the invention.

Each of I cells 510-530 may store multiple address offsets 540. Address offset 540 may store an address of one of the data cells within data cell memory 320 as an offset from the address of first data cell in a particular packet (as identified by data cell address 440 in notification 400).

Figure 6:
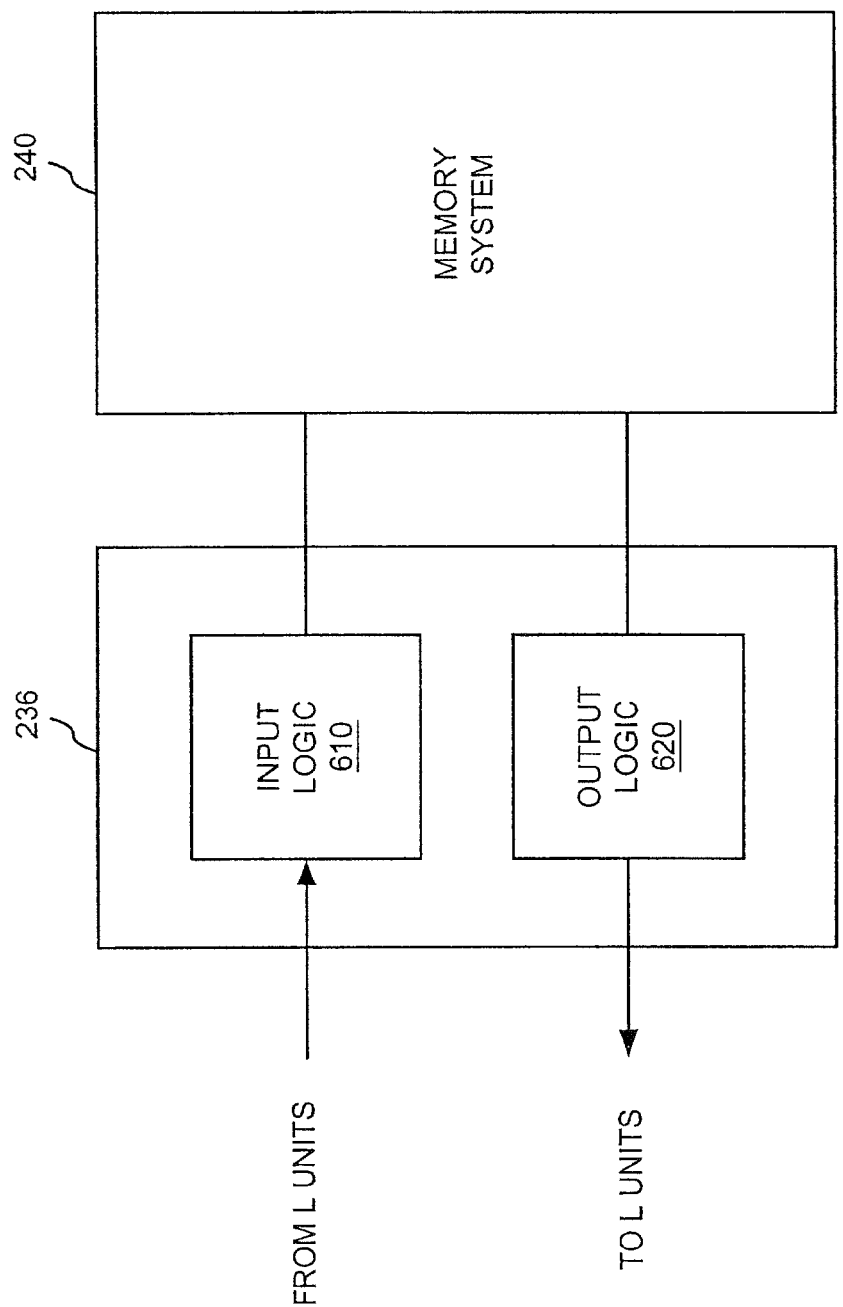
FIG. 6 is an exemplary diagram of the first I/O logic of FIG. 2 according to an implementation consistent with principles of the invention.

FIG. 6 is an exemplary diagram of first I/O logic 236, according to an implementation consistent with principles of the invention. Second I/O logic 238 may be configured in a similar manner. First I/O logic 236 includes input logic 610 and output logic 620. Input logic 610 receives data from PICs 210 and 220, via L units 232 and 234, and writes the data to memory system 240. In one embodiment, input logic 610 receives D cells from L units 232 and 234. Input logic 610 may extract information from the D cells to form a notification, write the D cells to memory system 240, store in the notification the address offsets identifying where the D cells were stored, and send the notification to R unit 242.

Output logic 620 handles data transfer in the direction opposite to input logic 610. Generally, output logic 620 receives notifications from memory system 240, reads D cells from memory system 240 based on the notification, and transfers the D cells to L units 232 and 234. Before transmitting the D cells, output logic 620 updates certain fields in the D cells using information from the notification. It should be understood that input logic 610 and output logic 620 for second I/O logic 238 process data received from and output to switch fabric 130 in a similar manner.

Figure 7:
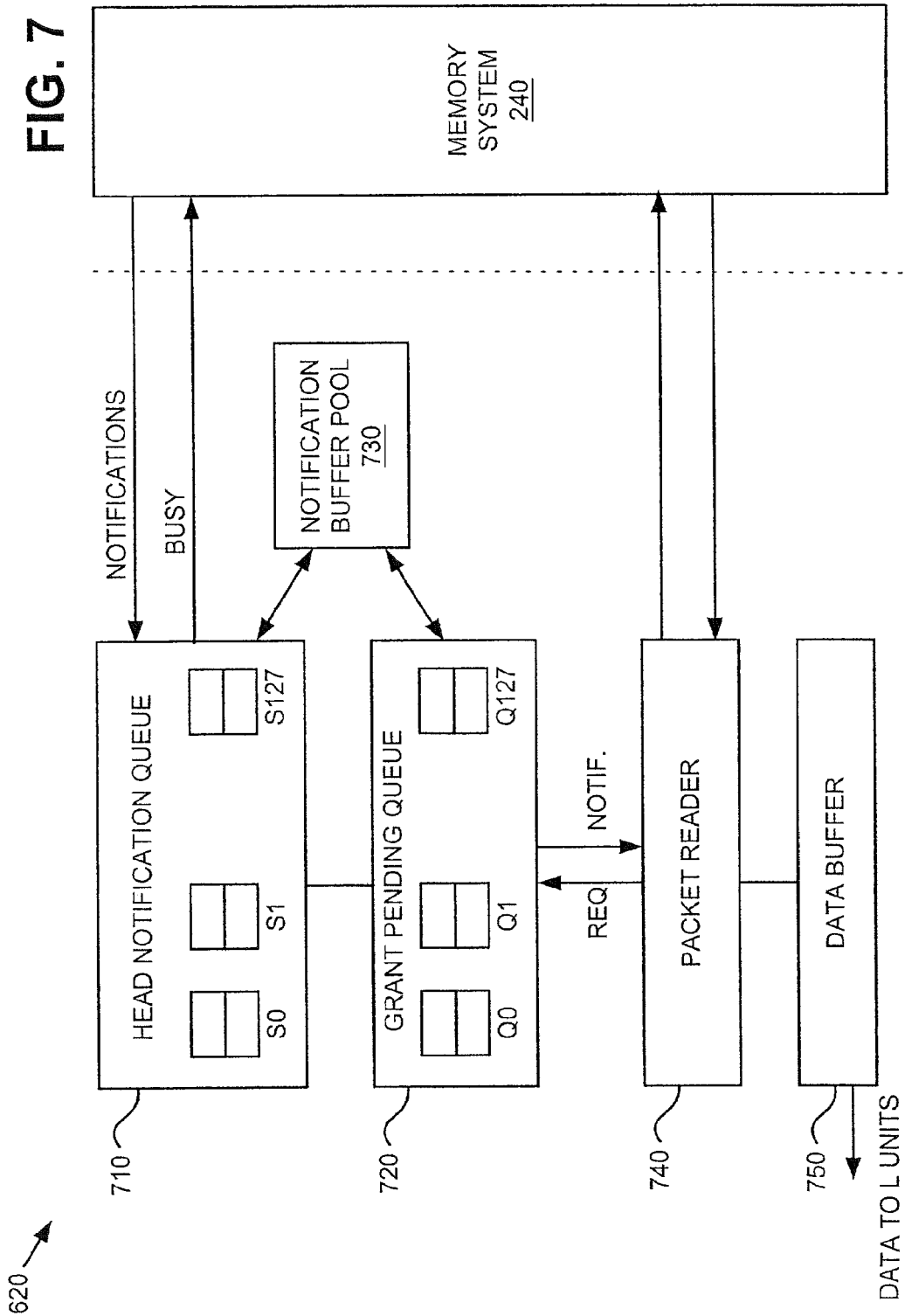
FIG. 7 is an exemplary diagram of the output logic of FIG. 6 according to an implementation consistent with principles of the invention.

FIG. 7 is an exemplary diagram of a portion of output logic 620 and memory system 240 according to an implementation consistent with principles of the invention. The portions of output logic 620 shown are involved in transferring data from memory system 240 to L units 232 and 234.

Referring to FIG. 7, output logic 620 includes head notification queue (HNQ) 710, grant pending queue 720, notification buffer pool 730, packet reader 740 and data buffer 750. HNQ 710, consistent with principles of the invention, includes a queue corresponding to each of 128 possible data streams (S0-S127). In other implementations, HNQ 710 may include other numbers of queues corresponding to the number of possible data streams supported by the first I/O logic 236. HNQ 710 may receive notifications from notification memory 310 (FIG. 3) in memory system 240.

Figure 8:
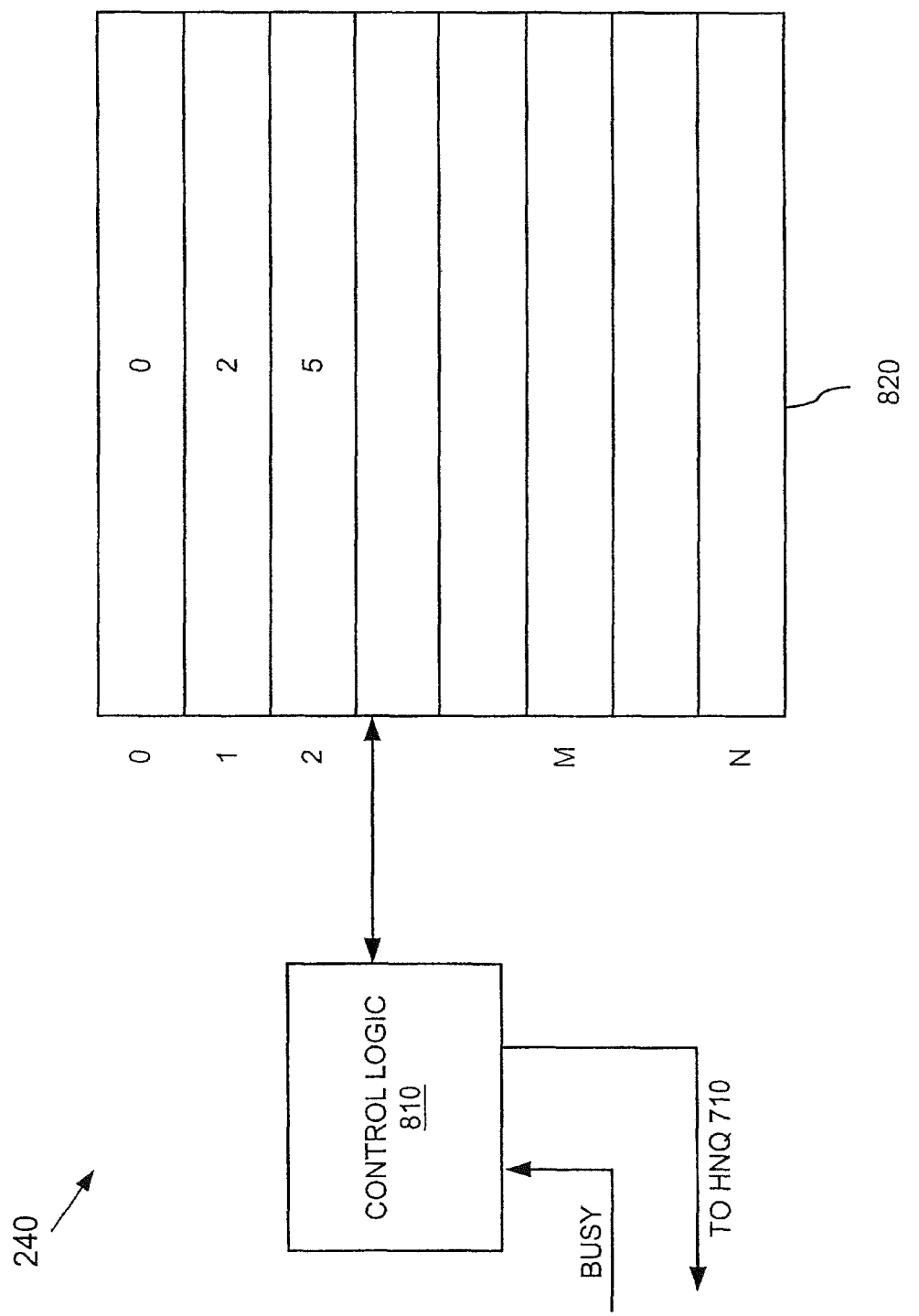
FIG. 8 is an exemplary diagram of a portion of the memory system of FIG. 2 according to an implementation consistent with principles of the invention.

According to an exemplary implementation consistent with the principles of the invention, memory system 240 uses an arbitration scheme to transfer notifications from notification memory 310 to HNQ 710 to guarantee a minimum level of service for each stream. For example, FIG. 8 illustrates a portion of memory system 240 consistent with principles of the invention. Memory system 240 includes control logic 810 and a programmable table 820. Each row in table 820 may be programmed, using a write address pointer, to store a stream identifier. Control logic 810 may use a time division multiplexing (TDM) scheme to read the values stored in table 820. For example, each row in table 820 may identify a time slot and the stream identifier may identify a particular stream. Control logic 810 determines which stream to service based on the values read from table 820.

For example, in FIG. 8, row 0 of table 820 corresponds to the first time slot and stores a value of "0." This indicates that at the first time slot, stream 0 is serviced. The next time slot stores the value "2," indicating that stream 2 is serviced next, and so on.

The number of entries in table 820 for a particular stream is proportional to the overall throughput needed for the stream. For example, an OC192 stream may have its stream number stored in every other location in table 820, while an OC3 and OC12 stream may each have only four entries spread out evenly over table 820. This ensures that higher speed data streams, such as an OC192 stream, will be serviced more often than slower speed data streams. In addition, no two consecutive rows in table 820 should be programmed with the same stream identifier because this may cause problems or errors when transferring the notifications to HNQ 710.

In an exemplary implementation consistent with principles of the invention and illustrated in FIG. 8, table 820 may include N rows. In one implementation, N may by 384. In other implementations, N may be larger or smaller. According to an implementation consistent with principles of the invention, control logic 810 reads rows 0 through M from table 820. After reading row M, control logic returns to row 0 and repeats the process. The rows from M through N are not read, but are available when new streams are added.

For example, if a new PIC is added, a portion of the rows from row M+1 through row N may be used to provide a time slot(s) for the new stream(s). In addition, if an existing stream requires a higher service rate from notification memory 310, table 820 may be reprogrammed so that the particular stream's identifier appears in a greater number of rows relative to the other streams. In this manner, memory system 240 is flexible so that when new streams are added, existing streams' requirements change or streams are removed, all the streams can be serviced by simply reprogramming the appropriate rows of table 820.

Control logic 810 may also receive a stream busy signal indicating that one or more streams are busy. For example, control logic 810 may receive a stream busy signal from HNQ 710. The stream busy signal may identify each stream that is busy or ineligible for service. In this case, control logic 810 bypasses the busy stream(s), thereby saving read bandwidth.

In addition, if no active notification is queued in notification memory 310 for a designated stream during that stream's timeslot, that timeslot may be bypassed or may be wasted (i.e., no data is transferred). In any event, memory system 240 transfers the notifications to HNQ 710 using an arbitration scheme that may be dynamically reconfigured to support any changes made, while ensuring that the bandwidth requirements of one stream do not adversely affect the bandwidth requirements of other streams.

HNQ 710 transfers the notifications received from memory system 240 to notification buffer pool 730 where they are stored and receives back the address where the notification is stored in notification buffer pool 730. HNQ 710 stores the addresses (i.e., notification pointers) of the respective notifications stored in notification buffer pool 730 in the queue corresponding to the data stream associated with the notification. For example, the queue labeled S1 stores addresses corresponding to notifications associated with stream 1. HNQ 710 arbitrates across queues S0 to S127, selects one, and dequeues a notification pointer from the selected queue. The notification pointer may be forwarded to GPQ 720.

The grant pending queue (GPQ) 720 includes a queue corresponding to each of the 128 possible data streams, labeled Q0-Q127. In other implementations, GPQ 720 may include other numbers of queues corresponding to the number of data streams. GPQ 720 receives the notification pointer from HNQ 710 and stores the notification pointer in the queue corresponding to the data stream. For example, a notification pointer from the queue labeled S1 in HNQ 710 may be stored in Q1 in GPQ 720.

Packet reader 740 requests GPQ 720 to retrieve notifications stored in notification buffer pool 730 and then generates read requests, as described in more detail below. Packet reader 740 transmits the read requests to memory system 240 and receives data cells (and I cells, if necessary) back from memory system 240, in response to the read requests. Packet reader 740 transfers the data cells to data buffer 750, along with some bookkeeping information, as described in more detail below. Data buffer 750 receives the data cells, reorders the data cells if necessary, and sends the reordered data cells to one of the L units, such as L units 232 and 234.

Figure 9:
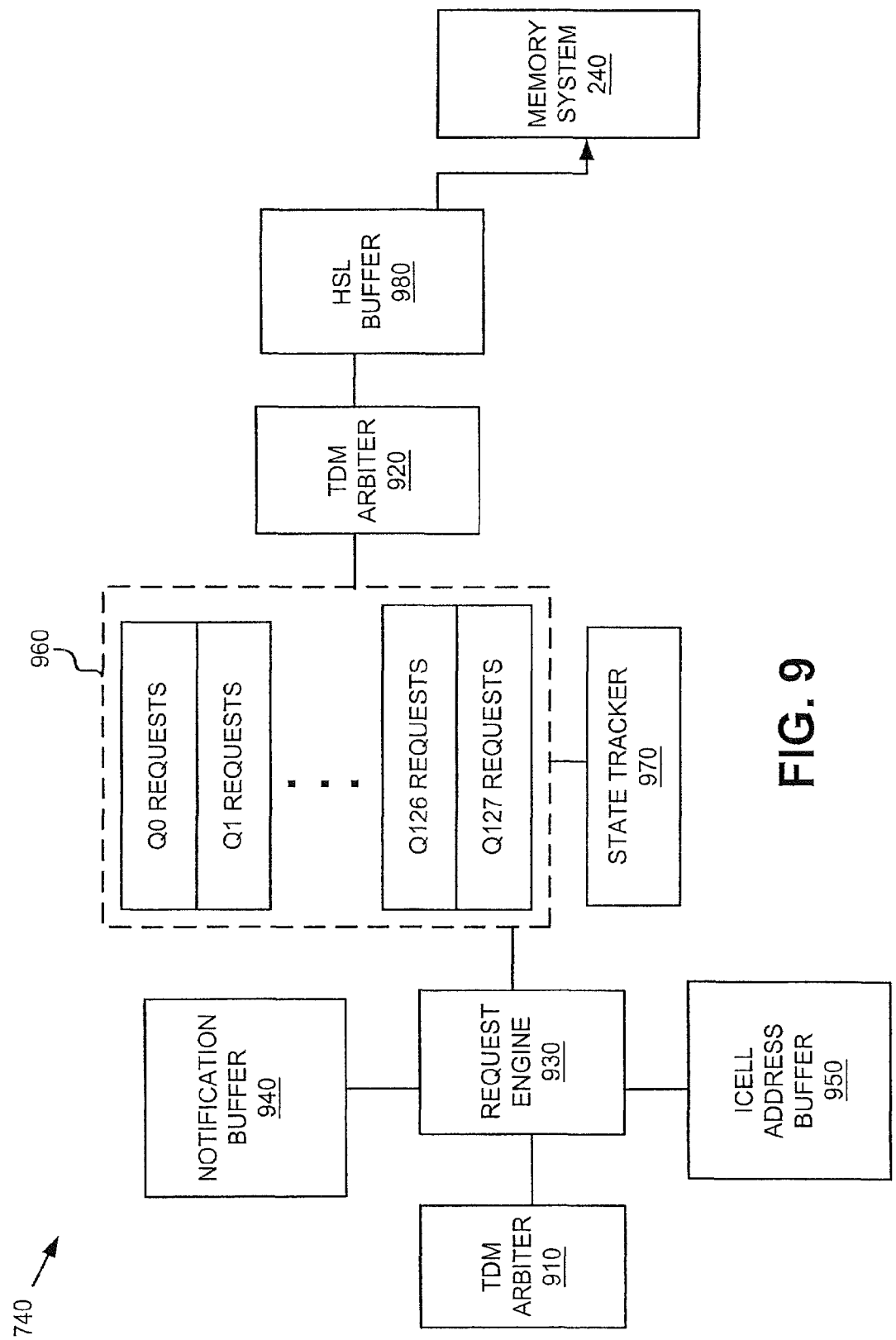
FIG. 9 is an exemplary diagram of the packet reader of FIG. 7 according to an implementation consistent with principles of the invention.

As described above, packet reader 740 performs processing associated with generating and transmitting read requests to memory system 240. FIG. 9 illustrates memory system 240 and a portion of packet reader 740 associated with generating and transmitting the read requests. Packet reader 740 may include time division multiplexing (TDM) arbiters 910 and 920, a request engine 930, a notification buffer 940, an I cell address buffer 950, a request queue 960, a state tracker 970 and a high-speed link (HSL) buffer 980.

Figure 10:
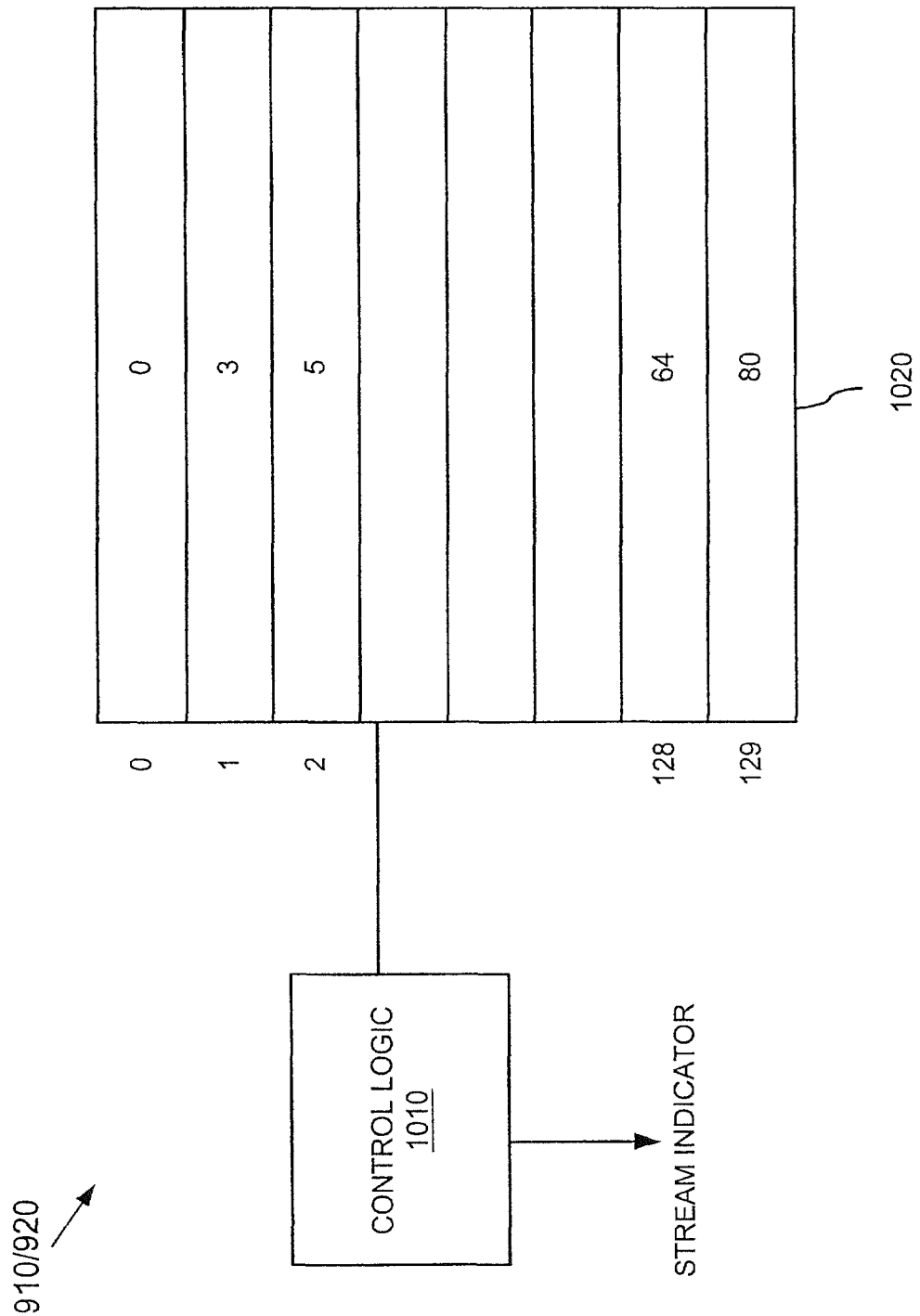
FIG. 10 is an exemplary diagram of the arbiters of FIG. 9 according to an implementation consistent with principles of the invention.

TDM arbiters 910 and 920 include logic for determining the order in which the data streams are to be serviced. For example, TDM arbiters 910 and 920 may be configured to guarantee that higher speed data streams are serviced more often than lower speed data streams. FIG. 10 illustrates a portion of TDM arbiters 910 and 920 consistent with principles of the invention. Referring to FIG. 10, TDM arbiters 910 and 920 each include control logic 1010 and memory 1020. The control logic 1010 determines which stream to service based on the entries in memory 1020. In an exemplary implementation, memory 1020 is a 130×8 bit memory, labeled as rows zero through 129 and storing exemplary values.

Each row in memory 1020 may correspond to a time slot, with each time slot being 2 cycles. The contents of each row in memory 1020 define the stream number to be serviced. In addition, in one implementation, two rows in memory 1020 may be allocated for direct memory access (DMA) operations. Referring to FIG. 10, row 0 of memory 1020 corresponds to the first time slot and stores a value of "0." This indicates that at the first time slot, stream 0 is serviced. The next time slot stores the value "3," indicating that stream 3 is serviced next, and so on. After the last entry (row 129) in memory 1020 is read, the control logic 1010 returns to row 0 and repeats the processing. When used in TDM arbiter 1010, for example, control logic 1010 sends the stream number information corresponding to the data stream that is to be serviced to request engine 930.

In an exemplary implementation, an optical carrier (OC) 192 stream may have its stream number stored in every other location in memory 1020, while an OC3 and OC12 stream may each have only four entries spread out evenly over memory 1020. This ensures that higher speed data streams, such as an OC192 stream, will be serviced more often than slower speed data streams.

In one implementation, the memories 1020 for TDM arbiters 910 and 920 include the same sequence of data stream information in the same rows. That is, the memories 1020 for TDM arbiters 910 and 920 may be essentially identical. In alternative implementations consistent with principles of the invention, the memories 1020 for TDM arbiters 910 and 920 may include stream numbers having the same frequency (i.e., the same number of entries for each stream), but in different orders.

Request engine 930 writes requests to request queue 960 using information from TDM arbiter 910 and notification and I cell information from notification buffer 940 and I cell address buffer 950. In an exemplary implementation, request engine 930 receives the stream number information from TDM arbiter 910 and notification and/or I cell address information from notification buffer 940 and I cell address buffer 950, respectively.

Notification buffer 940 may include one or more memory devices that store notifications. These notifications may be retrieved from notification buffer pool 730. The notifications may be stored on a per-stream basis within the notification buffer 940. The I cell address buffer 950 may similarly include one or more memory devices that store I cell address information. The I cell addresses may also be stored on a per-stream basis. The I cell address buffer 950 may store I cell addresses corresponding to notifications in notification buffer 940. Packets with associated I cells may be identified by a state bit associated with a notification pointer in a pointer queue (not shown). Alternatively, state tracker 970 may also store information regarding the existence of I cells for a particular packet. The notification and I cell address buffers 940 and 950 stores notifications and I cell address information for packets that await transmission by the output logic 620.

The request queue 960 stores read requests from request engine 930. In an exemplary implementation, the request queue 960 includes a queue for each of 128 possible data streams. For example, Q0 in request queue 960 may correspond to data stream 0. Each of the queues may store up to six read requests. Having each queue store the same number of read requests avoids the need for partitioning request queue 960 based on stream speed. This adds flexibility to router 100 when data stream speeds change. In addition, using six entries per stream has been found to optimize link bandwidth utilization, especially in the case of single cell streams. In other implementations, the number of queues and the number of requests stored in each queue may vary. In an exemplary implementation consistent with principles of the invention, each entry in the request queue 960 stores an address of a location in memory system 240.

Figure 11:
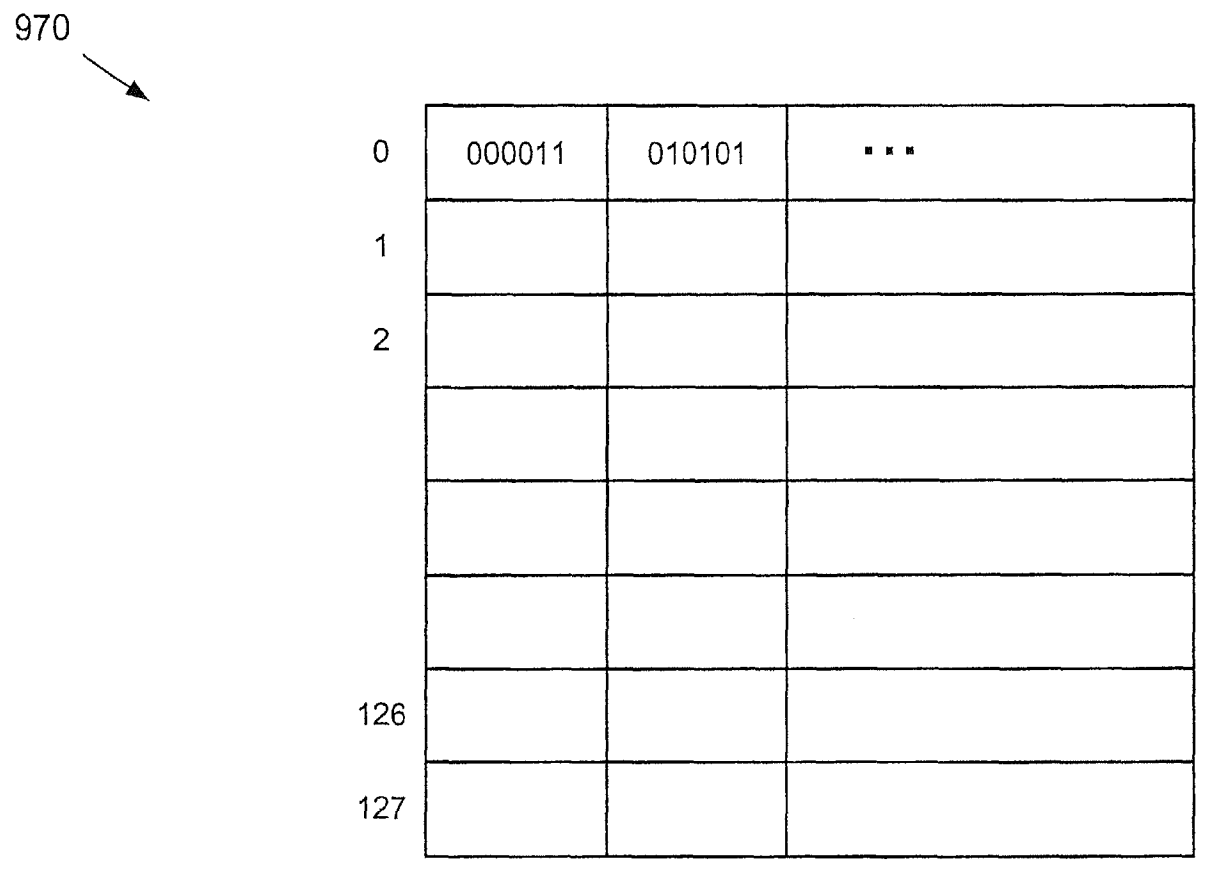

State tracker 970 may include one or more tables and/or other state-tracking elements that track the operation of the output logic 620. For example, state tracker 970 may store state information on a per-stream basis. FIG. 11 illustrates an exemplary implementation of an element of state tracker 970 consistent with principles of the invention. Referring to FIG. 11, state tracker 970 includes a number of rows corresponding to the number of data streams. In other words, state tracker 970 includes a number of rows corresponding to the number of queues in request queue 960. In an exemplary implementation, state tracker 970 includes 128 rows corresponding to 128 data streams. For example, row 0 of state tracker 970 corresponds to data stream 0.

Row 0 of state tracker 970 includes information corresponding to each of the entries in Q0 of request queue 960. For example, if each queue in request queue 960 includes 6 entries, each row in state tracker 970 includes 6 entries. In an exemplary implementation, state tracker 970 stores 6 bits of information for each of the entries in request queue 960. The first two bits may represent a bank number associated with memory system 240. For example, in an implementation consistent with principles of the invention, memory system 240 includes four separate memory devices or memory banks. When the first two bits of the entry in state tracker 970 are "00," this indicates that the corresponding memory bank is bank 0. When the first two bits are "01," this represents bank 01, and so on.

The next three bits in an entry in state tracker 970 may represent a pointer identifying the particular entry. For example, when bits 3-5 of the entry are "000," this may represent entry 0 of the six possible entries for a particular queue in request queue 960. When bits 3-5 are "001," this represents entry 1, and so on. The last bit in the 6-bit entry may be a valid bit, representing whether the 6-bit entry in state tracker 970 contains valid data.

The first entry in row 0 of state tracker 970 contains "000011." The first two bits (i.e., 00) represent bank 0 of four possible memory banks in memory system 240. The next three bits (001) represent entry 1 in Q0 of request queue 960 and the last bit (1) represents that the data is valid. Similarly, the next entry in row 0 of state tracker 970 in FIG. 11 (i.e., 010101) represents bank 1 of memory system 240, entry 2 in Q0 of request queue 960 and that the data is valid.

The state tracker 970 enables the output logic 620 to save space by using a single request queue 960 that services a number of data storage devices that make up memory system 240. For example, as described previously, memory system 240 may include four separate memory banks. In alternative implementations, the number of memory banks included in memory system 240 may be greater or smaller. In any event, the state tracker 970 tracks the order in which the requests are stored in request queue 960. For example, in one implementation consistent with principles of the invention, the leftmost entry in each of the rows of state tracker 970 corresponds to the earliest entry associated with that particular data stream. The location adjacent to the leftmost entry corresponds to the next earliest entry and so on. As each request in request queue 960 is processed, the corresponding entry in state tracker 970 is wrapped around to a rightmost position in its respective row, indicating that the request has been queued.

As described previously, the memories 1020 for TDM arbiters 910 and 920 may include the same sequence of data stream information in the same rows or the same frequency of data stream information, but in different orders. In any event, TDM arbiter 920 dequeues the read requests from request queue 960 based on the information stored in its memory 1020. In either case, TDM arbiter 920 may transfer the read requests to HSL buffer 980. HSL buffer 980 may buffer these read requests before passing them on to memory system 240.

The output logic 620, as described in more detail below, guarantees read bandwidth to each data stream so that no stream is starved for read bandwidth. This helps to ensure that packet underrun does not occur and improves data throughput.

Exemplary Processing

Figure 12:
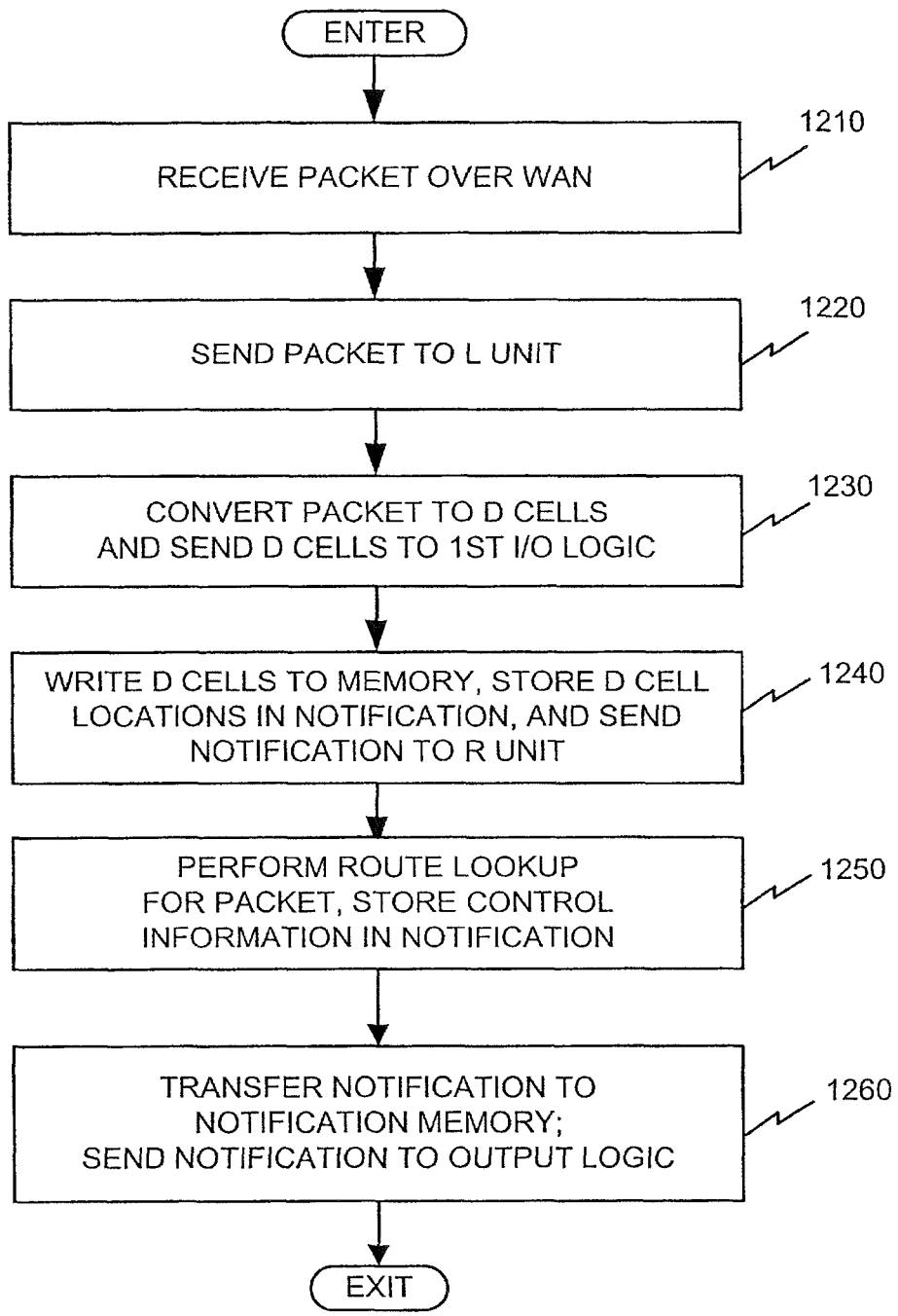
FIG. 12 is a flowchart of exemplary processing of a packet by the network device of FIG. 1 according to an implementation consistent with principles of the invention.

FIG. 12 is a flowchart of exemplary processing of a packet by the network device 100 of FIG. 1, according to an implementation consistent with principles of the invention. As discussed previously, network device 100 may receive up to 128 streams of data packets.

Processing may begin with a PIC, such as PIC 210, receiving a packet over a transmission medium, such as a WAN (act 1210). The packet may be one of several packets in a stream of packets transmitted between a source and a destination. PIC 210 may operate upon the packet and send the packet to L unit 232 (act 1220). For example, PIC 210 may strip off the layer 1 (L1) protocol information and forward the remaining data to L unit 232.

L unit 232 may convert the packets into D cells and send the D cells to first I/O logic 236 (act 1230). For example, L unit 232 may divide the data of the packet into units of fixed size, such as 64 bytes, for storing in the D cells. L unit 232 may also process the header of the packet, such as the layer 2 (L2) and layer 3 (L3) headers, and store L2 header information, L3 header information and header processing results in the D cells. Further, L unit 232 may create control information based on the packet. L unit 232 may store the control information in the D cells that it sends to first I/O logic 236.

First I/O logic 236 may write the D cells containing packet data into memory system 240 (act 1240). First I/O logic 236 may store the D cells in non-contiguous locations in memory system 240 and identify the respective addresses of the D cells as a function of their relationship (offset) to the first D cell in the packet. As described previously, in an exemplary implementation, memory system 240 may include four memory banks. The least two significant bits in the D cell address may be used to indicate the particular memory bank in which the D cells are to be stored. First I/O logic 236 may create a notification using fields extracted from the D cells, store the address offsets in the notifications, and send the notification to R unit 242 (act 1240). If there are more address offsets than will fit in the notification, first I/O logic 236 may store these additional offsets as one or more I cells in the address cell memory 330 (FIG. 3) in memory system 240.

R unit 242 may perform route lookup for the packet based on the forwarding table(s) from RE 110 (FIG. 1) and information in the notification (act 1250). For example, R unit 242 may analyze the forwarding table(s) using information in the notification to identify the PIC from which the packet is to be transmitted. R unit 242 may generate control information based on the route lookup and store the control information in the notification (act 1250).

R unit 242 may also transfer the updated notifications to notification memory 310 (act 1260). Notification memory 310 dequeues these notifications, as described previously in relation to FIG. 8, for processing by output logic 620 (act 1260). Assume, for example, that the packet is intended for the WAN (FIG. 2). In this case, output logic 620 begins reading the D cells from the memory system 240 and transmits the data to L units 232 and 234 to ensure that the line rates required by the output streams are met.

Figure 13:
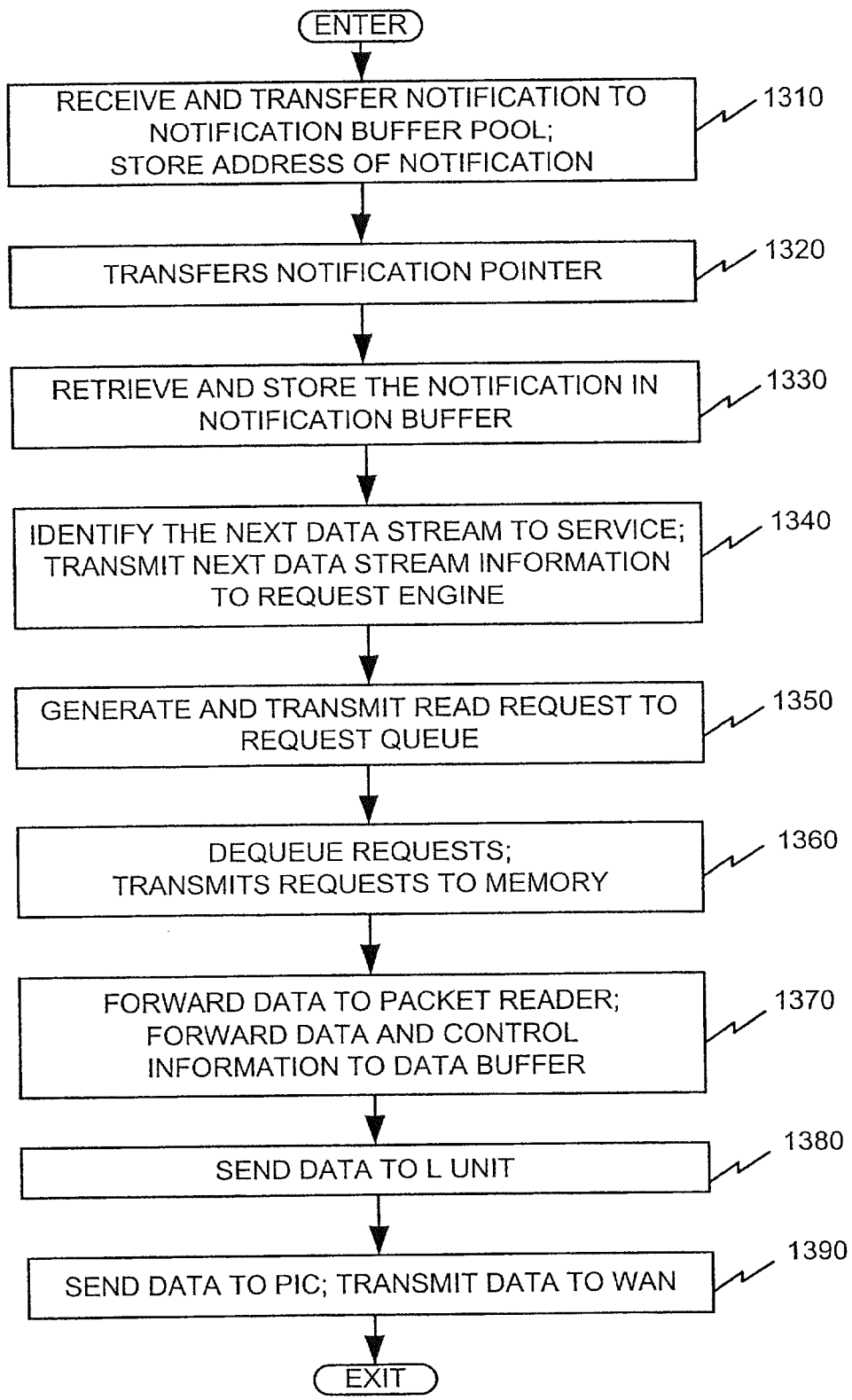
FIG. 13 is a flowchart of exemplary processing of a packet by the output logic of FIG. 6 according to an implementation consistent with principles of the invention.

FIG. 13 illustrates processing associated with reading data from memory system 240 consistent with the principles of the invention. Processing begins with output logic 620 receiving notifications from notification memory 310. In an exemplary implementation, HNQ 710 (FIG. 7) receives the notifications and transfers the notifications to notification buffer pool 730 for storage (act 1310). The HNQ 710 also stores the address of the notification in a queue corresponding to the data stream associated with the notification (act 1310). For example, referring to FIG. 7, if HNQ 710 receives a notification associated with stream 0, HNQ 710 stores, in the queue labeled S0, the address of the location in notification buffer pool 730 where the notification is stored (i.e., a notification pointer).

HNQ 710 transfers the notification pointer to GPQ 720 (act 1320). Packet reader 740 may start the read process by receiving the notification pointer from GPQ 720 and retrieving the corresponding notification from notification buffer pool 730 (act 1330). Referring to FIG. 9, packet reader 740 may store the notifications in notification buffer 940. Packet reader 740 may also store I cell address information associated with the notification in I cell address buffer 950, when appropriate.

TDM arbiter 910 identifies the next data stream to service using memory 1020 (act 1340). As discussed previously, memory 1020 includes information regarding which data stream to service at which particular time slot. For example, assume that TDM control logic 1010 initially reads, in the first time slot, the first row in memory 1020 (row 0). Row 0 stores the value "0" which indicates that stream 0 is read in the first time slot. TDM arbiter 910 then sends this information to request engine 930 (act 1340).

Request engine 930 receives the data stream information from TDM arbiter 910 regarding which data stream to service. Request engine 930 also retrieves notification information and/or I cell address information associated with the particular data stream that is to be serviced from notification buffer 940 and/or I cell address buffer 950. Request engine 930 may then generate and transmit a read request to request queue 960 (act 1350). If all the entries in request queue 960 for that particular data stream are filled, request engine 930 may bypass the generating and sending of a read request for that particular data stream. In an exemplary implementation, the read request includes the address of the data cell to be read from memory system 240. As described previously, the two least significant bits of the data cell address may be used to identify a memory bank number in memory system 240. For example, if the two least significant bits of the data cell address are "10," this may indicate that the data cells were stored in memory bank 2. State tracker 970 stores this information in the first two bits of the entry corresponding to the read request.

TDM arbiter 920 dequeues the requests in request queue 960 in a manner similar to the way that they are queued (act 1360). That is, control logic 1010 in TDM arbiter 920 reads its memory 1020 to determine the order in which the requests are dequeued. In an exemplary implementation, the order in which the requests are dequeued is the same as the order in which the requests are queued by TDM arbiter 910. In this manner, each data stream is guaranteed a certain read bandwidth and the higher speed data streams receive a greater read bandwidth than slower speed data streams. In addition, TDM arbiter 920 dequeues the requests associated with a particular data stream in the order in which they were queued. As described previously, state tracker 970 identifies the oldest entry for a particular data stream based on the location of the entries in the respective rows in state tracker 970. TDM arbiter 920 uses this information and dequeues the oldest entry for the particular data stream first. If no read requests are pending for a particular data stream during its assigned time slot, TDM arbiter 920 bypasses that data stream. TDM arbiter 920 transmits the requests to HSL buffer 980, where the requests are buffered before they are transmitted to memory system 240 (act 1360). In alternative implementations, TDM arbiter 920 may transmit the requests directly to memory system 240.

Memory system 240 receives the read request and transmits the appropriate data from memory system 240 to packet reader 740 (act 1370). Packet reader 740 forwards the data, along with some bookkeeping information to data buffer 750 (act 1370). For example, packet reader 740 may transmit information regarding the ordering of the data cells in a data packet. Data buffer 750 reorders the data cells, if necessary, and transmits the reordered cells to an L unit, such as L unit 232 or L unit 234 (act 1380).

The L unit, for example L unit 234 receives the data cells and sends the data cells to PIC 220 (act 1390). L unit 234 may not have enough buffer space to buffer an entire data packet while maintaining the required lines rates. Therefore, in implementations consistent with principles of the invention, L unit 234 may transmit the data cells for a particular data packet before all of the data cells for that packet have been read from memory system 240. In this manner, the FPC 230 (FIG. 2) continuously sends data cells to their intended destinations and avoids packet underrun and other errors, while maintaining the required line rates.

Other devices, such as PIC 220 may construct a packet header, such as L2 and/or L3 headers, from the notification and control information and transmit the data cells with the appropriate headers. The PIC 220 may transmit the packet on a transmission medium, such as a WAN (act 1290). PIC 220 may also encapsulate the packet in L1 protocol information before sending it out on the WAN.

CONCLUSION

Systems and methods, consistent with the principles of the invention, provide memory access to all data streams regardless of the activity associated with any particular data stream. This ensures that each data stream is guaranteed a read bandwidth, even when data traffic becomes unbalanced with regard to one or more of the data streams. In addition, the present invention transmits data cells associated with a packet without buffering an entire packet, avoids on-chip memory limitations and enables systems and methods consistent with the present invention to maintain the required line rates without packet underrun errors.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, systems and methods have been described for processing packets using a memory that may include a number of separate memory banks. In other implementations consistent with the present invention, the network device 100 may use a single memory or a memory divided into a number of portions.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A device comprising:
   a processor to:
   generate read requests, associated with a plurality of streams, based on a first schedule that:
   identifies an order for servicing a first data stream, of the plurality of streams, and a second data stream of the plurality of streams,
   a speed of the first data stream being higher than a speed of the second data stream, and
   indicates that the first data stream is to be serviced more often than the second data stream,
   a quantity of read requests, of the generated read requests, associated with the first data stream being greater than a quantity of read requests, of the generated read requests, associated with the second data stream,
   process the generated read requests based on a second schedule that:
   identifies an order in which the generated read requests are to be processed, and
   indicates that the first data stream is to be serviced more often than the second data stream, and
   read data units from a memory based on the processed read requests,
   the data units being associated with the first data stream and the second data stream.

2. The device of claim 1, where the processor is further to:
   store information identifying:
   a first order in which the read requests, of the generated read requests, were stored in the memory for the first data stream, and
   a second order in which the read requests, of the generated read requests, were stored in the memory for the second data stream, and
   where, when processing the generated read requests, the processor is further to:
   process the generated read requests further based on the first order and the second order.

3. The device of claim 1, where, when processing the generated read requests, the processor is further to:
   process the generated read requests further based on a time division multiplexing scheme.

4. The device of claim 1, where the first data stream comprises an optical carrier (OC) 192 data stream.

5. The device of claim 1, where the second data stream comprises one of:
   an optical carrier (OC) 3 data stream, or
   an OC 12 data stream.

6. The device of claim 1, where the processor is further to:
   receive the plurality of data streams,
   the plurality of data streams further including a third data stream,
   the speed of the first data stream being higher than a speed of the third data stream, and
   store information identifying the generated read requests in a plurality of memory locations of the memory,
   a first quantity, of the plurality of memory locations, being used to store information identifying the read requests, of the generated read requests, associated with the first data stream,
   a second quantity, of the plurality of memory locations, being used to store information identifying read requests, of the generated read requests, associated with the second data stream and the third speed data stream,
   the second quantity being less than the first quantity, and the first data stream being serviced more often than the second data stream based on the second quantity being less than the first quantity.

7. The device of claim 1, where the processor is further to:
generate at least one of the first schedule or the second schedule based on a time division multiplexing scheme.

8. A method comprising:
generating, by a network device, read requests associated with a plurality of data streams,
the read requests being generated based on a first schedule that:
identifies an order for servicing a first data stream, of the plurality data streams, and a second data stream of the plurality data streams,
a speed of the first data stream being higher than a speed of the second data stream, and
indicates that the first data stream is to be serviced more often than the second data stream,
a quantity of read requests, of the generated read requests, associated with the first data stream being greater than a quantity of read requests, of the generated read requests, associated with the second data stream;
processing, by the network device, the generated read requests based on a second schedule that:
identifies an order in which the generated read requests are to be processed, and
indicates that the first data stream is to be serviced more often than the second data stream; and
selectively outputting, by the network device, data units included in the first data stream and data units included in the second data stream based on the processed read requests.

9. The method of claim 8, further comprising:
generating at least one of the first schedule or the second schedule based on a time division multiplexing scheme.

10. The method of claim 8, further comprising:
storing information identifying a first order associated with storing information identifying the read requests, of the generated read requests, generated for the first data stream; and
storing information identifying a second order associated with storing information identifying the read requests, of the generated read requests, generated for the second data stream; and
where processing the generated read requests includes:
processing the generated read requests further based on the first order and the second order.

11. The method of claim 8, where processing the generated read requests includes:
processing the generated read requests using time division multiplexing.

12. The method of claim 8, where the first data stream comprises an optical carrier (OC) 192 data stream, and
where the second data stream comprises one of:
an OC 3 data stream, or
an OC 12 data stream.

13. The method of claim 8, further comprising:
storing information identifying the generated read requests in a plurality of memory locations of a memory associated with the device,
a first quantity, of the plurality of memory locations, being used to store information identifying the read requests, of the generated read requests, associated with the first data stream,
a second quantity, of the plurality of memory locations, being used to store information identifying read requests, of the generated read requests, associated with a plurality of other data streams,
the speed of the first data stream being higher than the speed of the plurality of other data streams,
the plurality of other data streams including the second data stream, and
the second quantity being:
less than the first quantity, or
equal to the first quantity,
the first data stream being serviced more often than the second data stream based on the second quantity being less than the first quantity or the second quantity being equal to the first quantity.

14. A system comprising:
a network device to:
generate read requests, associated with a plurality of data streams, based on a first schedule that identifies an order for servicing a first data stream, of the plurality of data streams, and a second data stream of the plurality of data streams,
a quantity of read requests, of the generated read requests, associated with the first data stream being greater than a quantity of read requests, of the generated read requests, associated with the second data stream,
process the generated read requests based on a second schedule that:
identifies an order in which the generated read requests are to be processed, and
indicates that the first data stream is to be serviced more often than the second data stream, and
transmit data units, of the first data stream and the second data stream, from the network device based on the processed read requests.

15. The system of claim 14, where the network device is further to:
store information identifying a first order associated with storing information identifying the read requests, of the generated read requests, generated for the first data stream and information identifying a second order associated with storing information identifying the read requests, of the generated read requests, generated for the second data stream, and
where, when processing the generated read requests, the network device is further to:
process the generated read requests further based on the first order and the second order.

16. The system of claim 14, where a first quantity of read requests, of the generated read requests, is greater than or equal to a second quantity of read requests of the generated read requests,
the first quantity being associated with the first data stream, and
the second quantity being associated with the second data stream,
the first data stream being serviced more often than the second data stream based on the first quantity being greater than or equal to the second quantity.

17. The system of claim 14, where the second schedule includes a time division multiplexing scheme, and
when processing the generated read requests, the network device is further to:
process the generated read requests based on the time division multiplexing scheme.

18. The system of claim 14, where the first data stream comprises an optical carrier (OC) 192 data stream, and where the second data stream comprises a plurality of other data streams,
a speed of the plurality other data streams being less than the speed of the first data stream,
the plurality of other data streams including at least one of:
an OC 3 data stream, or
an OC 12 data stream.

19. The system of claim 14, where the network device is further to:
store information identifying the generated read requests in a plurality of memory locations,
a first quantity, of the plurality of memory locations, being used to store information identifying read requests, of the generated read requests, associated with the first data stream,
a second quantity, of the plurality of memory locations, being used to store information identifying read requests, of the generated read requests, associated with the second data stream, and
the second quantity being less than the first quantity.

20. The system of claim 14, where the network device is further to:
generate at least one of the first schedule or the second schedule based on a time division multiplexing scheme.

* * * * *

UNITED STATES PATENT AND TRADEMARK OFFICE
CERTIFICATE OF CORRECTION

PATENT NO.        : 8,706,896 B2                         Page 1 of 1
APPLICATION NO.   : 13/587557
DATED             : April 22, 2014
INVENTOR(S)       : Song Zhang et al.

It is certified that error appears in the above-identified patent and that said Letters Patent is hereby corrected as shown below:

In the Claims

Claim 6, Column 14, line 65, after "third" delete "speed".

Signed and Sealed this
Twenty-ninth Day of July, 2014

Michelle K. Lee
*Deputy Director of the United States Patent and Trademark Office*